(12) United States Patent
Opela et al.

(10) Patent No.: US 7,039,443 B2
(45) Date of Patent: May 2, 2006

(54) METHOD AND APPARATUS FOR AUTOMATICALLY INITIATING A COMMUNICATION FROM A WIRELESS COMMUNICATION DEVICE

(75) Inventors: Peter S. Opela, Lake Worth, FL (US); Adam Mark Will, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 422 days.

(21) Appl. No.: 10/269,509

(22) Filed: Oct. 11, 2002

(65) Prior Publication Data
US 2004/0204122 A1 Oct. 14, 2004

(51) Int. Cl.
*H04M 1/00* (2006.01)
(52) U.S. Cl. .................... 455/565; 455/564; 455/550.1
(58) Field of Classification Search ................ 455/564, 455/565, 550.1, 403, 90.3, 566, 344, 347, 455/348; 379/428.01–428.04, 440, 433.01
See application file for complete search history.

(56) References Cited

U.S. PATENT DOCUMENTS

| | | | |
|---|---|---|---|
| 6,434,371 B1 * | 8/2002 | Claxton ..................... 455/90.1 |
| 6,434,404 B1 * | 8/2002 | Claxton et al. .......... 455/575.3 |
| 6,567,672 B1 * | 5/2003 | Park et al. .................. 455/574 |
| 6,816,363 B1 * | 11/2004 | Yamamoto .................. 361/681 |
| 2002/0028662 A1 * | 3/2002 | Yoshinaga .................... 455/90 |
| 2003/0083022 A1 * | 5/2003 | Oomori et al. ............... 455/90 |

* cited by examiner

Primary Examiner—CongVan Tran
(74) Attorney, Agent, or Firm—Daniel C. Crilly; Sylvia Chen (57) ABSTRACT

A wireless communication device (100) employs a method and apparatus for automatically initiating a communication with a target device. The communication device includes, inter alia, a user interface (115), an acoustic transducer (113), and an acoustic receptor (109). The user interface receives an identification of the target device (e.g., a telephone number) from a user while the communication device is configured in a first physical or mechanical configuration of at least two user-selectable configurations. Responsive to detecting a reconfiguration of the communication device from the first configuration (e.g., closed) into a second configuration (e.g., open), the communication device automatically initiates the communication with the target device, thereby eliminating the need for manual call initiation after the communication device is properly positioned for in-call use.

22 Claims, 6 Drawing Sheets

METHOD AND APPARATUS FOR AUTOMATICALLY INITIATING A COMMUNICATION FROM A WIRELESS COMMUNICATION DEVICE

FIELD OF THE INVENTION

The present invention relates generally to wireless communication devices that are mechanically re-configurable, and, in particular, to a method and apparatus for automatically initiating a communication from such a device.

BACKGROUND OF THE INVENTION

Cellular phones, pagers, personal digital assistants (PDAs) and other communication devices come in a variety of mechanical configurations. Some devices are relatively straight having their microphones and ear transducers available for use at all times. Such devices are often referred to as "candy bar" devices. Other devices are configurable into multiple positions or configurations depending on the current mode of the device. For example, devices, such as the i90c, i95cl, V60, V66, V70, and Timeport P8097 phones that are commercially available from Motorola, Inc. of Schaumburg, Ill., U.S.A. (hereinafter "Motorola"), are configurable into two positions, a closed position in which the device's microphone and ear transducer are adjacent one other to place the device in a standby mode (e.g., capable of receiving phone calls, but not placing them) and an open position in which the device's microphone and ear transducer are adequately separated to place the device in an in-use mode (e.g., capable of receiving and placing phone calls).

Communication devices such as Motorola's i90c, i95cl, V60, V66, and Timeport P8097 phones are configurable into their open and closed positions by rotating one part of the phone containing the ear transducer about a hinge relative to another part of the phone containing the microphone, wherein the rotation occurs in a plane perpendicular to a plane containing the part of the phone housing the microphone. Such phones or devices are typically referred to as "clamshell" or "flip" devices. Communication devices such as Motorola's V70 phone are configurable into their open and closed positions by similarly rotating the part of the phone containing the ear transducer relative to another part of the phone containing the microphone; however, in these devices, the rotation occurs in a plane substantially parallel to a plane containing the part of the phone housing the microphone. Devices such as Motorola's V70 phone may be referred to as "twist" or "rotational" devices. Re-configurable devices are used primarily to minimize the size of the device while the device is in its standby mode (closed position), while providing a more conventional phone or device feel to the user when the device is in its in-use mode (open position).

Other proposed designs for re-configurable wireless devices include the use of dual keypads. In such devices, one keypad (external keypad) is exposed to the device user when the device is in its closed position and another keypad (internal or covered keypad) is exposed only when the device is in its open position. One advantage to the use of dual keypads is that they simplify the user interface of the wireless device. Specifically, a user can dial or access the interface without reconfiguring the device (e.g., opening the flip cover). Another advantage to the use of dual keypads is that the wireless device manufacturer can make the device's display larger. A larger display allows more information to be viewed when the device is in the open position.

Re-configurable phones are typically designed to include a position detector, such as a conventional Hall effect sensor, to detect the current configuration of the device and software that enables the phone to automatically receive an incoming call upon opening the phone or terminate an ongoing call upon closing the phone. For example, most flip phones generate an off-hook signal and thereby accept an incoming voice call responsive to the phone user opening the flip phone. Such phones also generate an on-hook signal and thereby terminate a current voice call responsive to the phone user closing the flip phone. However, re-configurable devices do not provide for automatic initiation of outgoing communications responsive to the phone's configuration. That is, when a user wishes to place a call using a flip phone with an external keypad, the user must still press the "SEND" button on either the phone's external keypad or internal keypad to initiate the call. Such a requirement to press the "SEND" button can cause frustration for users that complete dialing a phone number on the external keypad of a dual keypad phone, but forget to press the "SEND" button before opening the flip cover and positioning the phone adjacent their head in expectation of beginning the call. Also, such a requirement extends the time that a user may be distracted from more important activities, such as driving, when placing mobile phone calls.

Therefore, a need exists for a method and apparatus for initiating a communication from a re-configurable wireless communication device that provide for automatic initiation of the communication responsive to a mechanical reconfiguration of the wireless device.

DETAILED DESCRIPTION OF A PREFERRED EMBODIMENT

Generally, the present invention encompasses a method and apparatus for automatically initiating a communication from a wireless communication device to a target communication device. The wireless communication device includes, inter alia, a user interface, an acoustic transducer (e.g., a speaker), and an acoustic receptor (e.g., a microphone). The user interface receives an identification of the target communication device (e.g., a telephone number) from a user while the communication device is configured in a first physical or mechanical configuration of at least two user-selectable configurations. Responsive to detecting a reconfiguration of the communication device from the first configuration (e.g., closed or minimized) into a second configuration (e.g., open or fully extended), the communication device automatically initiates the communication to the target device. By automatically initiating a communication in this manner, users of cell phones that have different mechanical configurations for in-use and standby modes, such as clamshell, flip, or twist phones, need not manually initiate a call (e.g., press the "SEND" button") after entering the phone number and positioning the phone into the proper configuration for in-call use. The positioning of the phone for in-call use is sufficient to automatically initiate the call, thereby saving the user the time required to manually initiate the call and eliminating the need for the user to remember to manually initiate the call after reconfiguring the phone. The present invention is particularly, although not solely, useful in mechanically re-configurable devices that include external user interfaces (e.g., keypads, scroll buttons, thumbwheels, microphones for voice-activated dialing, and so forth) that permit device users to enter data associated with voice calls (e.g., telephone numbers) while the device is in its closed or normal standby configuration.

Figure 1:
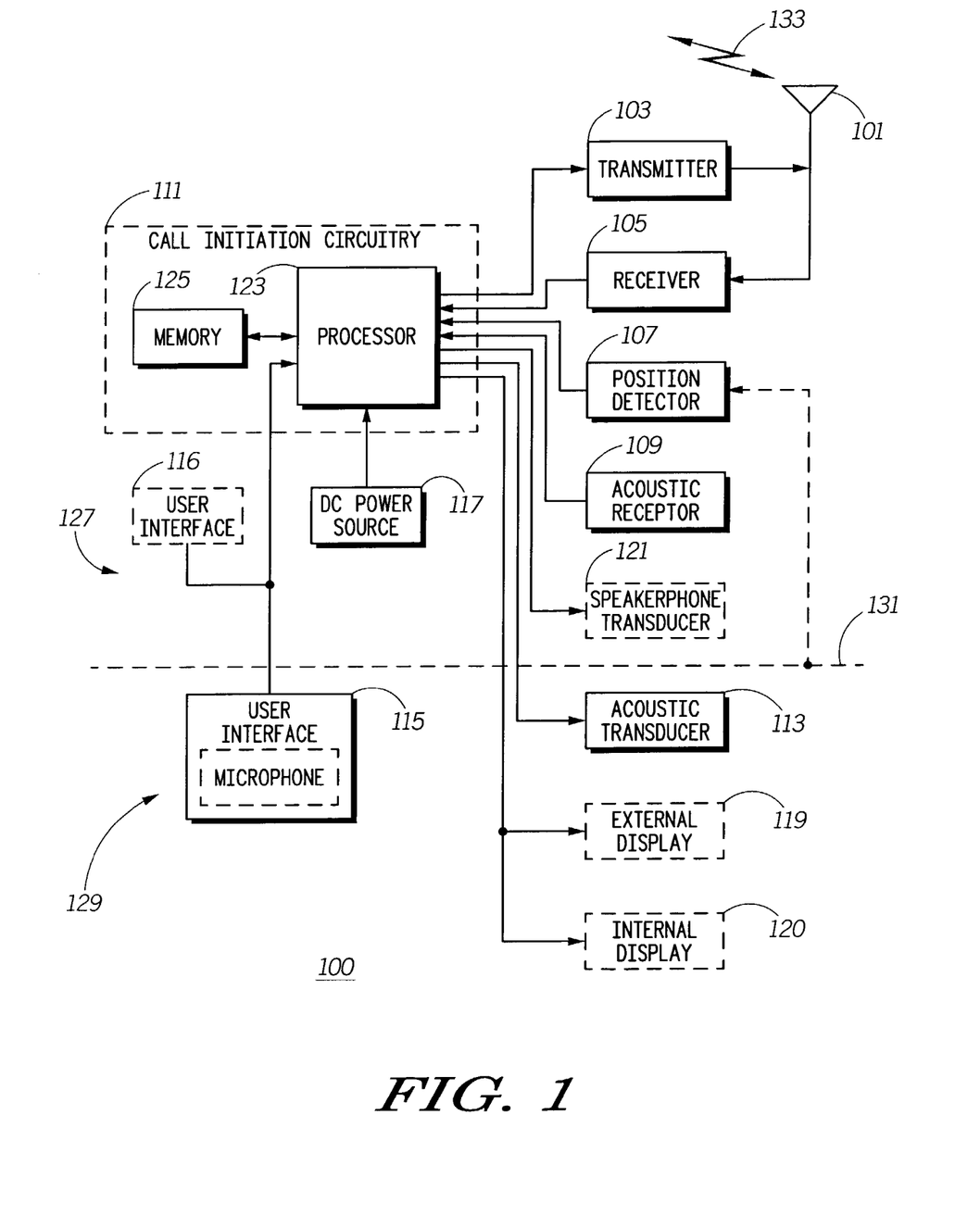
FIG. 1 is an electrical block diagram of a wireless communication device in accordance with a preferred embodiment of the present invention.

The present invention can be more fully understood with reference to FIGS. 1–6, in which like reference numerals designate like items. FIG. 1 is an electrical block diagram of a wireless communication device 100 in accordance with a preferred embodiment of the present invention. The wireless communication device 100 may be any type of wireless device—including without limitation, a cellular phone, a pager, a personal digital assistant (PDA), a laptop or palmtop computer, a two-way radio, a cordless telephone, or any device combining the functionality and operations of the foregoing devices—that is configurable by its user into two or more physical configurations (e.g., open and closed; open, half-open, and closed; or any number of positions ranging from an open or fully extended configuration to a closed or minimized configuration). The wireless device 100 includes, inter alia, an antenna 101, a transmitter 103, a receiver 105, a position detector 107, an acoustic receptor 109, call initiation circuitry 111, an acoustic transducer 113, a user interface 115, and a direct current (DC) power source 117. The wireless device 100 may also include other conventional elements, such as an additional user interface 116, an external display 119, an internal display 120, and a high volume transducer 121 (e.g., miniature loudspeaker) capable of supporting speakerphone operation, depending on the desired implementation of the device 100. The components of the wireless device 100 are preferably arranged as shown in and/or on two or more housing members 127, 129 (two shown for illustration purposes) that are mechanically coupled together through use of a hinge 131 (e.g., in a flip phone implementation), bearings, a cam and/or a cam follower (e.g., in a twist phone implementation), or any other conventional means that allows at least two of the housing members 127, 129 to move relative to each other.

The antenna 101, the transmitter 103 and the receiver 105 are well-known components of conventional wireless communication devices. The antenna 101 may be any conventional antenna designed and configured to facilitate radio transmissions at the radio or microwave frequencies used in the applicable communication system. The transmitter 103 and the receiver 105 enable the communication device 100 to communicate information (voice and/or data) to and acquire information from a base transceiver (e.g., base site, cell site, wireless local area network access point, or cordless phone base unit) or another wireless communication device. In this regard, the transmitter 103 and the receiver 105 include appropriate, conventional circuitry to enable digital or analog transmissions over a wireless communication channel 133. Although not shown in FIG. 1, the communication device 100 may optionally include an antenna switch, duplexer, circulator or other means of isolating the receiver 105 from the transmitter 103 in accordance with known techniques.

The implementations of the transmitter 103 and the receiver 105 depend on the implementation of the wireless device 100. For example, the transmitter 103 and the receiver 105 may be implemented as an appropriate wireless modem, or as conventional transmitting and receiving components of two-way wireless devices. In the event that the transmitter 103 and the receiver 105 are implemented as a wireless modem, the modem may be internal to the wireless device 100 or insertable into the wireless device 100 (e.g., embodied in a commercially available wireless radio frequency (RF) modem implemented on a wireless transceiver card that complies with the Personal Computer Memory Card International Association (PCMCIA) standard). For a wireless cellular telephone, pager or two-way radio, the transmitter 103 and the receiver 105 are preferably implemented as part of the wireless device hardware and software architecture in accordance with known techniques. One of ordinary skill in the art will recognize that most, if not all, of the functions of the transmitter 103 and/or the receiver 105 may be implemented in a processor, such as processor 123 forming part of the call initiation circuitry 111. However, the processor 123, the transmitter 103, and the receiver 105 have been artificially partitioned herein to facilitate a better understanding of the present invention.

The position detector 107 preferably comprises a magnetic switch, such as a conventional silicon Hall effect sensor that is commercially available from various manufacturers (e.g., Allegro Microsystems of Worchester, Mass., U.S.A. or Infineon Technologies AG of Munchen, Germany). Alternatively, the position detector 107 may be an electromechanical switch, an optical switch, or any other conventional position sensing device or system. The position detector 107 is arranged to enable the position detector 107 to sense a position or change of position of one housing member 127 relative to another housing member 129. In a flip or clamshell device embodiment, the position detector 107 is operably coupled to a hinge 131 that mechanically interconnects housing member 127 to housing member 129.

The call initiation circuitry 111 preferably includes a processor 123 and a memory 125, which processor 123 and memory 125 may form part of the central processor and memory used by the wireless device 100 to perform many of the device's conventional functions. As discussed in more detail below, the call initiation circuitry 111 preferably transmits a channel request or other equivalent message to initiate a communication in accordance with conventional techniques responsive to input from the position detector 107; consequently, the call initiation circuitry 111 may also include the transmitter 103 and/or the antenna 101. The processor 123 preferably includes one or more microprocessors, microcontrollers, digital signal processors (DSPs), state machines, logic circuitry, or any other device or devices that process information based on operational or programming instructions. Such operational or programming instructions are preferably stored in the memory 125, which memory 125 may be an integrated circuit (IC) memory chip containing any form of random access memory (RAM) or read only memory (ROM), a floppy disk, a compact disk read only memory (CD-ROM), a digital versatile disk (DVD), a flash memory card or any other medium for storing digital information. One of ordinary skill in the art will recognize that when the processor 123 has one or more of its functions performed by a state machine or logic circuitry, the memory 125 containing the corresponding operational instructions may be embedded within the state machine or logic circuitry. The operations performed by the processor 123 and the rest of the wireless communication device components are described in detail below. Alternatively, the call initiation circuitry 111 may be implemented solely in hardware, using conventional digital logic components.

The acoustic receptor 109 preferably comprises a microphone or any other device capable of receiving audio or acoustic energy from an audio source. The acoustic transducer 113 preferably comprises a conventional transducer or low power speaker for transmitting acoustic energy to a user of the wireless device 100. The user interface 115 (or each user interface 115, 116 when two or more are included) may be any conventional user interface mechanism, including without limitation, a keypad, a touchscreen, a keyboard, a joystick, a rollerball, a thumbwheel, a set of scroll buttons, a graphic user interface (GUI), a mouse, or any combination of the foregoing devices. In the event that the wireless device 100 supports voice-activated operation (e.g., dialing), the user interface 115, 116 may include an acoustic receptor, such as a microphone, to facilitate such operation. Alternatively, so as not to require an additional microphone or other acoustic receptor, the primary acoustic receptor 109 may also form part of the user interface 115 for voice-activation purposes.

The DC power source 117 preferably comprises a single battery or an arrangement of batteries, although other DC power sources, such as fuel cells may be utilized. The displays 119, 120, when utilized, preferably comprise liquid crystal displays (LCDs), electronic ink displays, light emitting diode (LED) displays, organic LED (OLED) displays, liquid plasma displays, or any other conventional electronic displays.

Operation of the wireless communication device 100 occurs substantially as follows in accordance with the present invention. When a user of the wireless device 100 desires to initiate a communication (e.g., make a call or send a data message), the user enters an ID of the device with which the user desires to communicate (i.e., the target device) via a user interface 115 that is accessible to the user when the wireless device 100 is in its closed configuration. The target device ID, which may be a telephone number, a private dispatch ID, a person's or business name, a nickname, an alias, or any other device ID entered by the user (which entry may include selecting the ID from a stored list), is supplied to the call initiation circuitry 111 and stored temporarily in memory (e.g., memory 125). The term "closed configuration" or "closed position" as used herein refers to a mechanical configuration in which the wireless device 100 is in its most compact state. In a flip or clamshell device embodiment, the closed configuration is the configuration in which the two housing members 127, 129 are positioned adjacent to each other, such that the acoustic receptor 109 is positioned substantially adjacent to the acoustic transducer 113 and at least one of the acoustic transducer 113 and the acoustic receptor 109 is partially or wholly impaired (e.g., covered) by the opposite housing member 127, 129. The term "open configuration" or "open position" as used herein refers to a mechanical configuration in which the wireless device 100 is in its least compact state.

In a flip or clamshell device embodiment, the open configuration is the configuration in which the two housing members 127, 129 are no longer positioned adjacent to each other, such that neither the acoustic transducer 113 nor the acoustic receptor 109 is partially or wholly impaired (e.g., covered) by a housing member 127, 129.

Some time after entry of the target device ID, the user reconfigures the wireless device 100 into the open configuration. The change in the present configuration of the wireless device 100 is detected by the position detector 107 and communicated to the call initiation circuitry 111. As illustrated in greater detail below with respect to FIGS. 2–5, the position detector 107 detects the repositioning of the housing members 127, 129 when the user reconfigures the wireless device 100 from its closed configuration to its open configuration. The position detector 107 preferably generates one signal (e.g., logic 1) when the wireless device 100 is in the closed configuration and another signal (e.g., logic 0) when the wireless device 100 is in the open configuration. Thus, a change in the signal output by the position detector 107 informs the call initiation circuitry 111 of a corresponding change in the configuration of the device 100.

Having been informed of the change in configuration, the call initiation circuitry 111 automatically initiates the communication in accordance with the applicable protocol of the communication system in which the wireless device 100 operates. For example, when the wireless device 100 is a cellular telephone, upon detecting a change in configuration of the device 100 from the closed configuration to the open configuration, the call initiation circuitry 111 prepares and transmits, via the transmitter 103 and the antenna 101, a conventional channel request message to a base transceiver station in the cellular telephone system. Alternatively, when the wireless device 100 is a cordless telephone, upon detecting a change in configuration of the device 100 from the closed configuration to the open configuration, the call initiation circuitry 111 prepares and transmits, via the transmitter 103 and the antenna 101, a conventional call initiation message to a base transceiver unit in the cordless telephone system, wherein the call initiation message instructs the base unit to generate an appropriate dual tone multi-frequency (DTMF) signal representative of the telephone number input by the user via the exposed user interface 115.

In the preferred embodiment, the call initiation circuitry 111 includes a processor 123 and a memory 125. The processor 123 executes operating instructions (software) stored in the memory 125 to, inter alia, receive inputs from the user interface(s) 115, 116, monitor the state of the position detector output to determine whether the configuration of the wireless device 100 has been changed, and take appropriate action based on changes in configuration. For example, when, after receiving a communication-related input from the device user via an external user interface 115, the position detector output signal indicates a change in device configuration from the closed configuration to the open configuration, the processor 123, executing applicable software stored in memory 125, initiates a communication as appropriate in the particular communication system. The processor 123 may also be programmed to automatically terminate an ongoing communication responsive to detection by the position detector 107 of a re-configuration of the device 100 from the open configuration back into the closed configuration. As in conventional re-configurable cellular phones, the processor 123 may be further programmed to automatically receive an incoming communication responsive to detection by the position detector 107 of a re-configuration of the device 100 from the closed configuration into the open configuration after the wireless device user has been alerted of the incoming communication.

Figure 2:
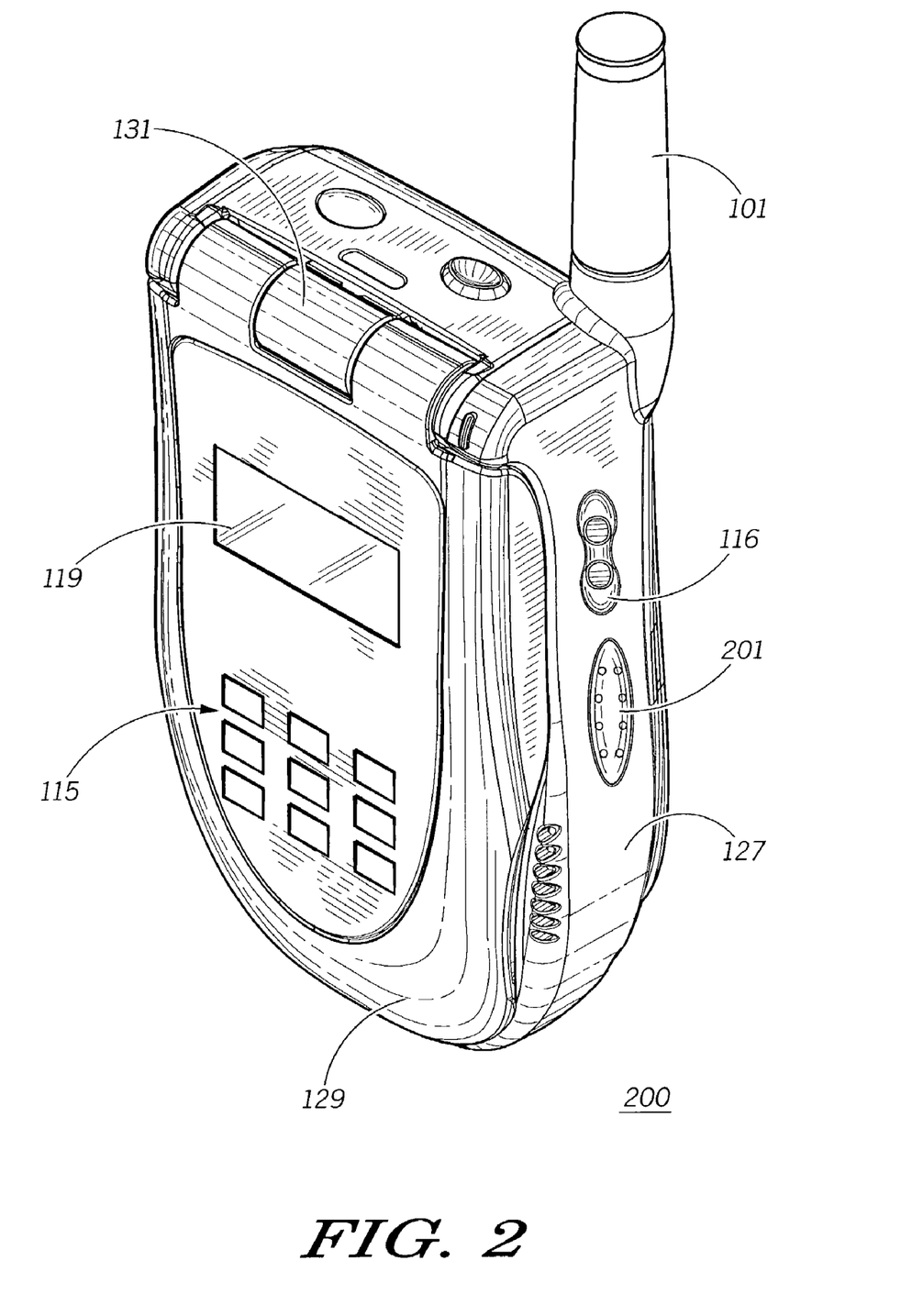
FIG. 2 is front, top and right perspective view of an exemplary wireless communication device in a closed configuration in accordance with one embodiment of the present invention.
Figure 3:
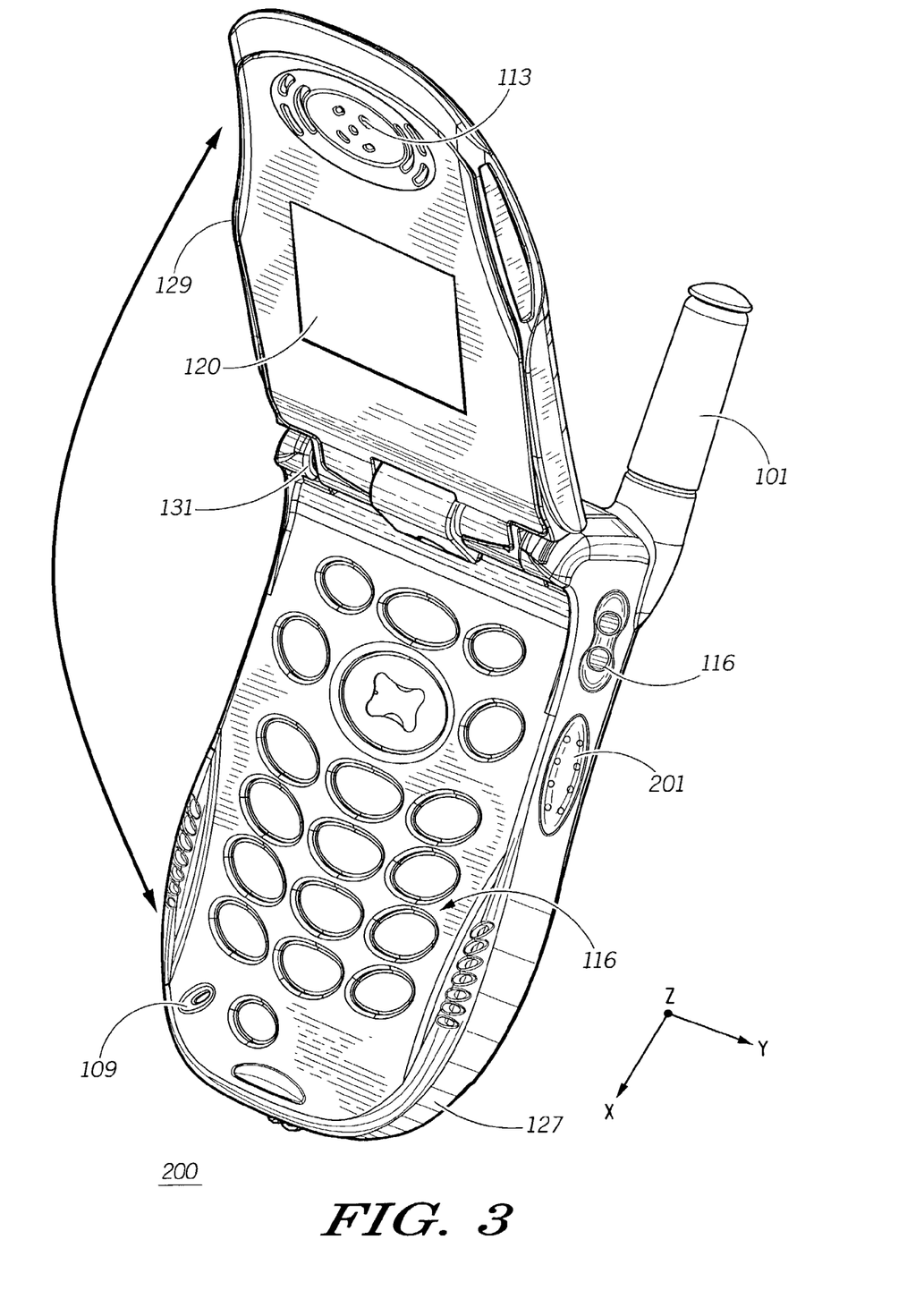
FIG. 3 is a front, top and right perspective view of the wireless communication device of FIG. 2 in an open configuration.

FIGS. 2 and 3 illustrate an exemplary wireless communication device 200 in a closed configuration and an open configuration, respectively, in accordance with one embodiment of the present invention. As is evident to those skilled in the art, FIGS. 2 and 3 illustrate a flip or clamshell embodiment of a re-configurable wireless device 200. The communication device 200 depicted in FIGS. 2 and 3 preferably includes all the elements of the wireless device 100 depicted in FIG. 1; however, only some of the elements are viewable externally (i.e., the elements identified with corresponding reference numerals), while other elements are housed internally and therefore not viewable in the FIGs. (e.g., call initiation circuitry 111, DC power source 117, transmitter, 103, receiver 105, position detector 107 and speakerphone transducer 121 (when included)). In this embodiment, the exposed or external user interface of the device 200 in the closed configuration is a combination of user interface 115 (e.g., a keypad) and part of user interface 116 (e.g., a set of scroll buttons or keys). Alternatively, only one user interface (e.g., a keypad or a set of scroll buttons) need be available to the user while the device 200 is in the closed configuration. The communication device 200 may also include a push-to-talk button 201 and associated, conventional circuitry and software to support dispatch communications in the event that the device 200 is dispatch-capable.

In the closed configuration of this embodiment, both the acoustic transducer 113 and the acoustic receptor 109 are impaired from normal use. For example, housing member 129 covers the acoustic receptor 109 and housing member 127 covers the acoustic transducer 113. Due to the impaired nature of the acoustic transducer 113 and the acoustic receptor 109, the closed configuration is typically associated with standby operation of the device 200. However, if the device 200 is dispatch-capable, and includes a speakerphone transducer 121 and a sensitive microphone or other acoustic receptor 109, the device 200 may be used as a two-way radio or speakerphone in either the open configuration or the closed configuration in accordance with known techniques.

In operation, the user preferably enters the ID of the target device (e.g., wireless or wireline telephone, two-way radio, pager, email server, short message server, or other conventional device capable of participating in a voice and/or data communication) through the external user interface (e.g., user interface 115). After entering the target device ID, the user rotates housing member 129 about hinge 131 to reconfigure the device 200 into the open position, such that the two housing members 127, 129 are no longer positioned substantially adjacent one another as they were in the closed position. In the open configuration of this embodiment, both the acoustic transducer 113 and the acoustic receptor 109 are unimpaired, thereby facilitating normal use. That is, in the open configuration, housing member 129 no longer covers the acoustic receptor 109 (e.g., microphone) and housing member 127 no longer covers the acoustic transducer 113 (e.g., low power speaker). Due to the unimpaired nature of the acoustic transducer 113 and the acoustic receptor 109, the open configuration is typically associated with in-use operation of the device 200. In this embodiment, the rotation of housing member 129 is made in a plane (e.g., X-Z plane) that is substantially perpendicular to the planes (X-Y planes) in which the housing members 127, 129 reside when at rest in the closed configuration.

The position detector 107 detects the rotation of housing member 129 about the hinge 131 and generates an appropriate output signal to indicate the change in position of the housing members 127, 129 (e.g., logic 1 or 0, depending on implementation). The call initiation circuitry 111, having received the target ID from the user interface 115 and the open configuration signal from the position detector 107, automatically initiates the communication without any further user input. Thus, once the user enters the target device ID and opens the flip housing 129, the call automatically proceeds, thereby eliminating the need to press the "SEND" or an equivalent button on any user interface 115, 116 after positioning the device 200 in the open configuration.

Figure 4:
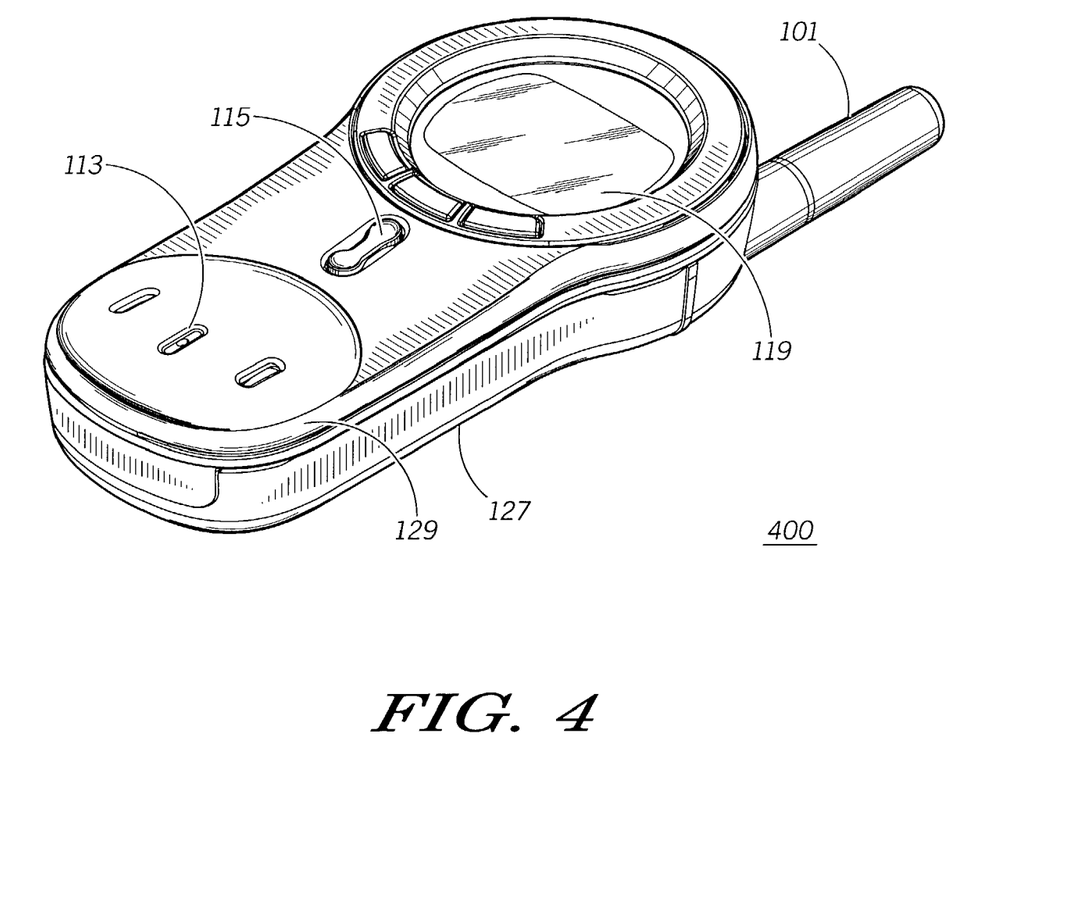
FIG. 4 is front, top and left perspective view of another exemplary wireless communication device in a closed configuration in accordance with an alternative embodiment of the present invention.
Figure 5:
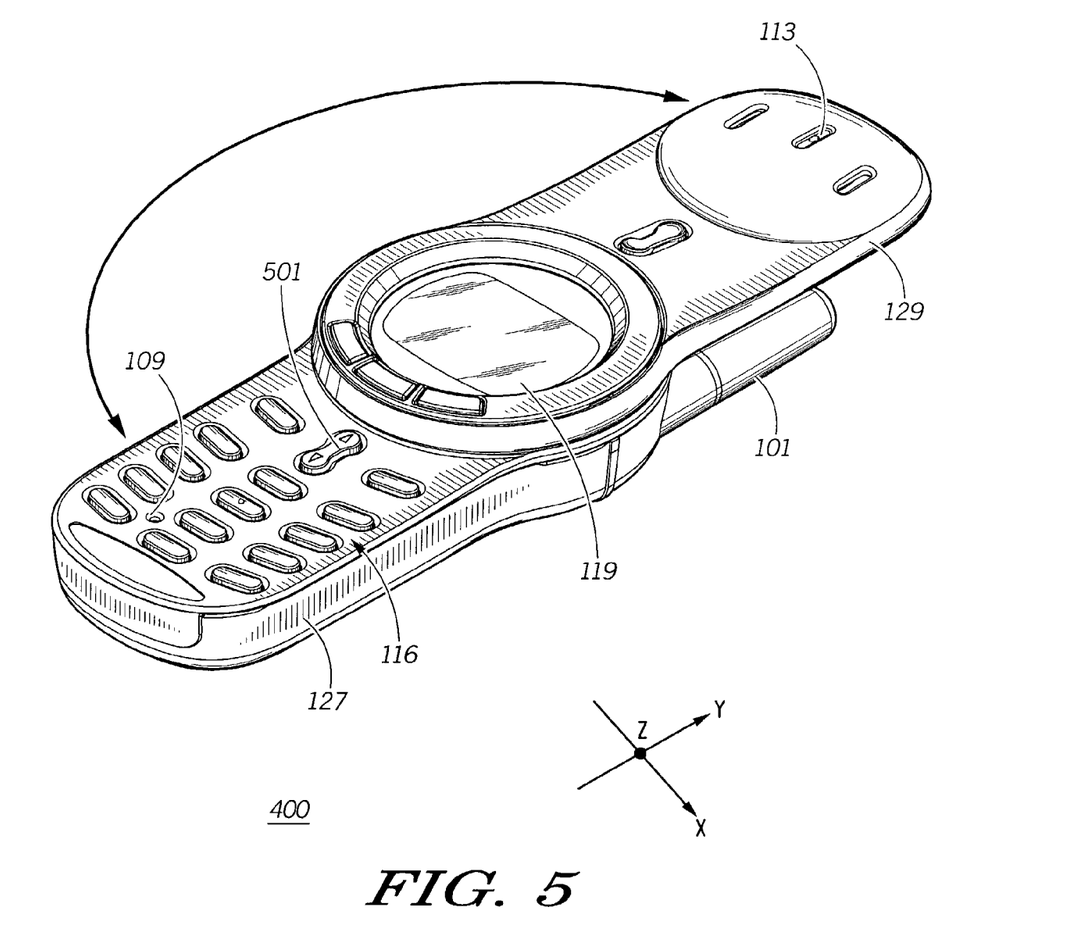
FIG. 5 is a front, top and left perspective view of the wireless communication device of FIG. 4 in an open configuration.

FIGS. 4 and 5 illustrate an exemplary wireless communication device 400 in a closed configuration and an open configuration, respectively, in accordance with another embodiment of the present invention. The communication device 400 depicted in FIGS. 4 and 5 includes most of the elements of the wireless device 100 depicted in FIG. 1; however, only some of the elements are viewable externally (i.e., the elements identified with corresponding reference numerals), while others are housed internally and therefore not viewable in the FIGs. (e.g., call initiation circuitry 111, DC power source 117, transmitter, 103, receiver 105, position detector 107 and speakerphone transducer 121 (when included)). In this embodiment, the exposed or external user interface of the device 400 in the closed configuration is user interface 115 (e.g., a scroll key). Also in this embodiment, the external display 119 (i.e., the display viewable when the device 400 is in its closed position) remains the single display for all physical configurations of the device 400, in contrast to the separate external and internal displays 119, 120 contained in the flip phone embodiment depicted in FIGS. 2 and 3. Further in this embodiment, the internal user interface 116 includes a scroll key 501 that serves as the external user interface 115 when accessed through a matching key on the surface of housing 129.

In the closed configuration of this embodiment, in contrast to the closed configuration of the flip phone embodiment depicted in FIG. 2, only the acoustic receptor 109 is impaired from normal use. For example, in the embodiment depicted in FIGS. 4 and 5, housing member 129 covers the acoustic receptor 109, but housing member 127 does not cover the acoustic transducer 113. Thus, FIGS. 2 and 3 depict a device embodiment in which both the microphone and the speaker are impaired in the closed configuration; whereas, FIGS. 4 and 5 depict a device embodiment in which only one of the microphone and the speaker (in this case, the microphone) is impaired in the closed configuration. While both embodiments of FIGS. 2–5 illustrate closed configurations in which one or both of the acoustic receptor 109 and the acoustic transducer 113 are completely covered (fully impaired), one of ordinary skill in the art will appreciate that complete covering or full impairment is not a necessary requirement for defining the closed configuration, and that partial or no impairment to the acoustic receptor 109 and/or the acoustic transducer 113 may alternatively occur when the device 100, 200, 400 is in the closed configuration. Further, while the two embodiments depicted in FIGS. 2–5 illustrate closed configurations in which the acoustic receptor 109 is positioned substantially adjacent the acoustic transducer 113, one of ordinary skill in the art will appreciate that such positioning of the acoustic receptor 109 relative to the acoustic transducer 113 is not a necessary requirement for defining the closed configuration, and that non-adjacent positioning of the acoustic receptor 109 and the acoustic transducer 113 may alternatively occur when the device 100, 200, 400 is in its closed configuration.

In operation, the user preferably enters (e.g., selects from a displayed list) the target device ID or an equivalent identifier (e.g., person or business name, nickname or alias stored in memory (e.g., memory 125)) through the external user interface 115. After entering the target device ID or equivalent identifier, the user rotates housing member 129 to reconfigure the device 400 into the open position, such that the two housing members 127, 129 are no longer positioned substantially adjacent one another as they were in the closed position. In the open configuration of this embodiment, as in the corresponding open configuration of the flip phone embodiment depicted in FIGS. 2 and 3, both the acoustic transducer 113 and the acoustic receptor 109 are unimpaired, thereby facilitating normal use. In this embodiment, the rotation of housing member 129 is made in a plane (e.g., X-Y plane) that is substantially parallel to the planes (X-Y planes) in which the housing members 127, 129 reside when at rest in the closed configuration.

The position detector 107 detects the rotation of housing member 129 into the open configuration and generates an appropriate output signal to indicate the change in position of the housing members 127, 129 (e.g., logic 1 or 0, depending on implementation). The call initiation circuitry 111, having received the target ID from the user interface 115 and the open configuration signal from the position detector 107, automatically initiates the communication without any further user input. Thus, once the user enters the target device ID and rotationally opens housing 129, the call automatically proceeds, thereby eliminating the need to press the "SEND" or an equivalent button on any user interface 115, 116 after positioning the device 400 in the open configuration.

As described above, the present invention provides a wireless communication device that automatically initiates a communication after receiving a target device ID from the device user while in a closed configuration, and being reconfigured into an open configuration generally used for operation of the device during the communication. Therefore, with the present invention, a device user need only input the necessary call information and open or configure the device for in-call use in order to place the call. In sharp contrast to prior art cellular telephones, there is no need to press the "SEND" or an equivalent button to start the call. Thus, the present invention is particularly applicable for use in or with re-configurable devices having user interfaces that are accessible and normally used when the devices are in their closed configurations, but which require repositioning of the devices into their open configurations in order to effectively use the devices during respective communications.

Figure 6:
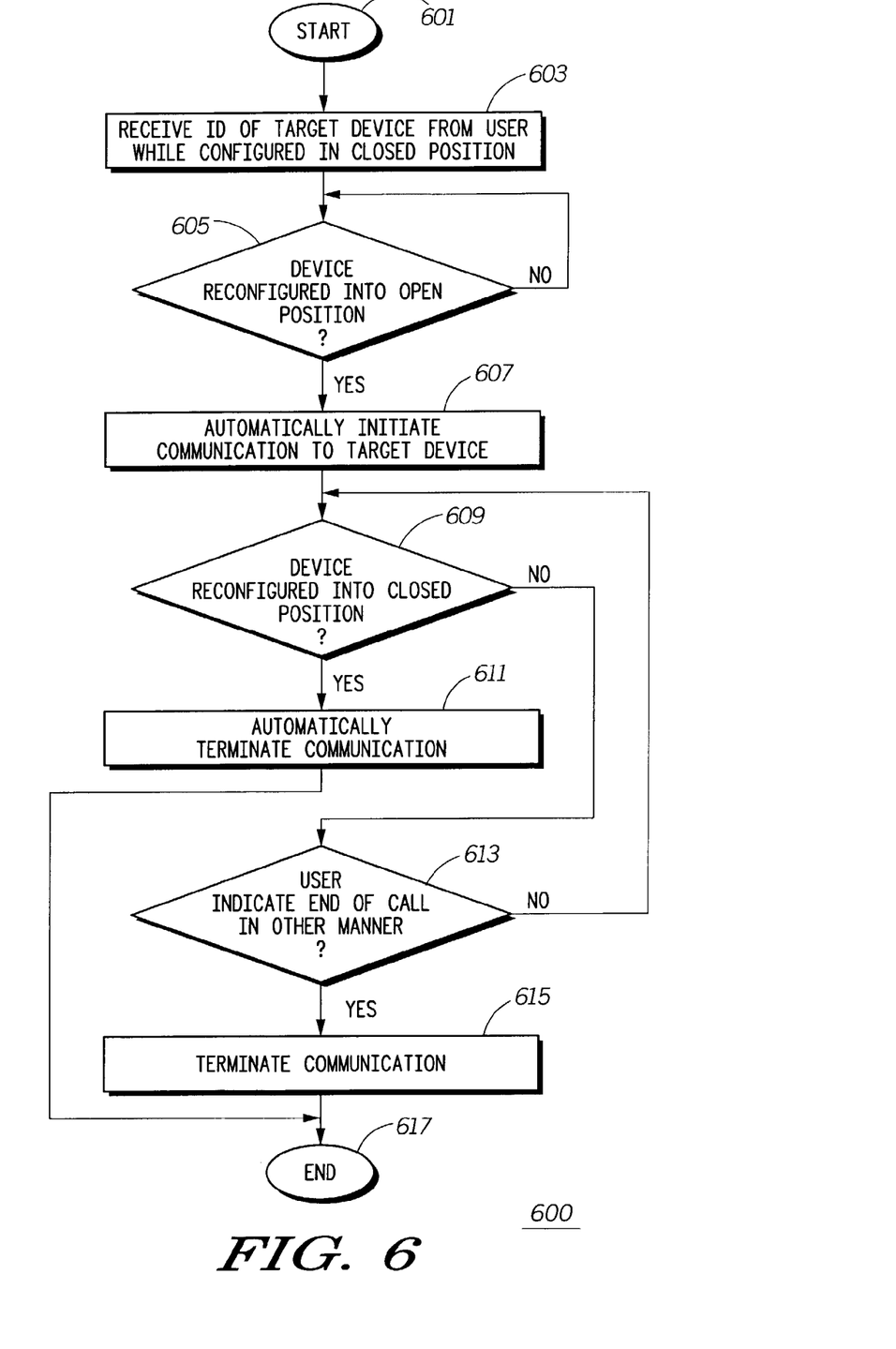
FIG. 6 is a logic flow diagram of steps executed by a wireless communication device to automatically initiate a communication in accordance with a preferred embodiment of the present invention.

FIG. 6 is a logic flow diagram 600 of steps executed by a wireless communication device to automatically initiate a communication in accordance with a preferred embodiment of the present invention. The logic flow begins (601) when the communication device receives (603) an identification (ID) of a target communication device (e.g., a landline telephone or another wireless communication device) from a user while the communication device is configured in the closed configuration. The ID (e.g., a telephone number, a private dispatch ID, or a name associated with a telephone number or private ID) is preferably received through a user interface of the communication device that is exposed to the user while the device is configured in the closed configuration. Examples of such a user interface include a keypad, a keyboard, a thumbwheel, a set of scroll buttons, a touch-screen, a joystick, a rollerball, or any other conventional means of entering data into wireless devices or selecting data stored in wireless devices. Alternatively or additionally, the user interface may include a microphone or other acoustic receptor in the event that the communication device includes conventional voice activation or recognition capabilities. In such a case, the microphone or other acoustic receptor may also serve as the general acoustic receptor of the wireless device for purposes of engaging in two-way voice communications.

After receiving the target device ID from the user, the communication device determines (605) whether it has been reconfigured into the open or some other in-use configuration. Such a determination is preferably made through the use of a switch or any other conventional position sensing device or system to detect a repositioning of one member of the device (e.g., the member containing the device's acoustic transducer) relative to another member of the device (e.g., the member containing the device's microphone or other acoustic receptor), such that the two members are no longer positioned adjacent to each other as they were in the closed or standby position. In an embodiment in which the device member containing the device's ear transducer and the device member containing the device's microphone are mechanically joined together by a hinge (e.g., when the wireless device is a clamshell or flip device), the determination of whether the device has been reconfigured into the open position is preferably made by using a Hall effect sensor to detect the rotation of the earpiece member about the hinge in a direction associated with positioning the earpiece away from the microphone. In the open position, the ear transducer is preferably positioned a predetermined distance away from the microphone in accordance with known techniques to reduce the likelihood of audio feedback during a full-duplex voice communication.

Responsive to detecting that the wireless device has been reconfigured into the open position, the wireless device automatically initiates (607) a communication with the target device without any additional input from the wireless device user. In a preferred embodiment, the wireless device transmits the ID of the target device to a base transceiver (e.g., a base transceiver site, a cell site, or a cordless phone base unit). Depending on the protocol of the wireless system in which the wireless device is operating, various other conventional types of information (e.g., wireless device ID, channel allocation request, and so forth) may also be transmitted together with the target device's ID in order to initiate and establish the communication in accordance with known techniques.

After the communication has been established, the wireless device preferably determines (609) whether it has been reconfigured back into the closed position, or alternatively whether the wireless device user has otherwise indicated (613) the end of the communication (e.g., by pressing the "END" or some other equivalent button on the device). In the event that the wireless device detects a reconfiguration of the wireless device back in to the closed position, the device automatically terminates (611) the communication without further user intervention in accordance with conventional techniques, and the logic flow ends (617). In the event that the user indicates an end of call in some other conventional manner, the wireless device terminates (615) the communication in accordance with conventional techniques after receiving such indication, and the logic flow ends (617).

The present invention encompasses a method and apparatus for automatically initiating a communication from a physically or mechanically re-configurable wireless communication device to a target communication device. With this invention, users need only position their re-configurable wireless devices into the applicable in-use position in order to initiate their desired communications. Thus, the present invention eliminates the need for a user to insure that the "SEND" button is pushed after the user completes dialing or selecting the target device's number or ID and reconfigures the user's wireless device into a desired position for in-call use. The present invention is particularly useful in wireless devices that have external or dual keypads because the user can dial the desired number and then simply open or re-configure the device to initiate the call once the user is ready to proceed. Reconfiguring the device to initiate the call is also generally preferable to pressing the "SEND" button because the reconfiguration operation can be performed while the user's eyes are focused elsewhere, in contrast to pressing the "SEND" button, which typically requires the user to look at the device's keypad to accurately locate the button. Providing the user the ability to remain focused on a current task instead of searching for the "SEND" button is a significant safety improvement over existing cellular phone designs.

In the foregoing specification, the present invention has been described with reference to specific embodiments. However, one of ordinary skill in the art will appreciate that various modifications and changes may be made without departing from the spirit and scope of the present invention as set forth in the appended claims. For example, the wireless device 100 may include a sliding arrangement of housing members 127, 129 instead of a rotational arrangement. In such a case, the sliding of one member 127 relative to the other member 129 would be detected by the position detector 107. Alternatively, the wireless device 100 may include more than two housing members and/or more than two configurations. In such a case, the wireless device processor 123 would determine, based on the output signal of the position detector 107, when the device 100 was configured in a configuration associated with initiating a call and, upon making such a determination, automatically initiate the call. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for initiating a communication from a wireless communication device that includes at least a user interface, an acoustic transducer and an acoustic receptor, the wireless communication device being selectively configurable into at least two physical configurations, the method comprising the steps of:
   receiving, via the user interface, an identification of a target communication device for participation in the communication while the wireless communication device is configured in a first configuration of the at least two physical configurations;
   detecting a reconfiguration of the wireless communication device into a second configuration of the at least two physical configurations; and
   automatically initiating the communication with the target communication device responsive to detecting the reconfiguration of the wireless communication device into the second configuration.

2. The method of claim 1, wherein at least one of the acoustic transducer and the acoustic receptor is at least partially impaired when the wireless communication device is configured in the first configuration, and both the acoustic transducer and the acoustic receptor are substantially unimpaired when the wireless communication device is configured in the second configuration.

3. The method of claim 1, wherein the first configuration is a physical configuration in which the wireless communication device is in its most compact state and the second configuration is a physical configuration in which the wireless communication device is in its least compact state.

4. The method of claim 1, wherein the user interface comprises a keypad that is exposed to a user when the wireless communication device is configured in the first configuration and wherein the step of receiving the identification of the target communication device comprises the step of receiving an input from the keypad while the wireless communication device is configured in the first configuration.

5. The method of claim 1, wherein the wireless communication device comprises two members positioned substantially adjacent to one another when the wireless communication device is configured in the first configuration, and wherein the step of detecting a reconfiguration of the wireless communication device into the second configuration comprises the step of detecting a repositioning of a first member of the two members relative to a second member of the two members such that the two members are no longer positioned substantially adjacent to one another.

6. The method of claim 5, wherein the two members are mechanically coupled together by a hinge and wherein the step of detecting a reconfiguration of the wireless communication device into the second configuration comprises the step of detecting a rotation of one of the two members about the hinge such that the two members are no longer positioned substantially adjacent to one another.

7. The method of claim 1, wherein the step of automatically initiating the communication comprises the step of transmitting the identification of the target communication device to a base transceiver.

8. The method of claim 1, wherein the identification of the target communication device comprises a telephone number.

9. The method of claim 1, further comprising the steps of:
   detecting a reconfiguration of the wireless communication device back into the first configuration after initiating the communication; and
   automatically terminating the communication responsive to detecting the reconfiguration of the wireless communication device back into the first configuration.

10. A wireless communication device comprising:
    an acoustic transducer;
    an acoustic receptor;
    a user interface arranged to receive an input from a user identifying a target communication device for participation in a communication while the wireless communication device is configured in a first configuration of at least two physical configurations;

a position detector arranged to detect a change in a present physical configuration of the wireless communication device; and call initiation circuitry, operably coupled to the position detector and the user interface, that automatically initiates the communication with the target communication device responsive to input from the position detector indicating a reconfiguration of the wireless communication device into a second configuration of the at least two physical configurations.

11. The wireless communication device of claim 10, wherein the call initiation circuitry comprises:

a processor, operably coupled to at least the user interface and the position detector; and a memory operably coupled to the processor, the memory including operating instructions that, when executed by the processor, control the processor to automatically initiate the communication with the target communication device responsive to input from the position detector indicating a reconfiguration of the wireless communication device into the second configuration.

12. The wireless communication device of claim 11, wherein the memory further includes operating instructions that, when executed by the processor, control the processor to:

automatically terminate the communication responsive to input from the position detector indicating a reconfiguration of the wireless communication device back into the first configuration.

13. The wireless communication device of claim 10, wherein the position detector comprises one of an electromechanical switch and a magnetic switch.

14. The wireless communication device of claim 10, wherein the user interface comprises at least one of a keypad, a touchscreen, a keyboard, a joystick, a rollerball, a thumbwheel, and a set of scroll buttons.

15. The wireless communication device of claim 10, wherein the acoustic transducer is a speaker and wherein the acoustic receptor is a microphone.

16. The wireless communication device of claim 10, wherein at least one of the acoustic transducer and the acoustic receptor is at least partially impaired when the wireless communication device is configured in the first configuration, and both the acoustic transducer and the acoustic receptor are substantially unimpaired when the wireless communication device is configured in the second configuration.

17. The wireless communication device of claim 10, further comprising two members positioned substantially adjacent to one another when the wireless communication device is configured in the first configuration, a first member of the two members including the acoustic transducer and a second member of the two members including the acoustic receptor, wherein the position detector is arranged to detect a repositioning of the first member relative to the second member such that the two members are no longer positioned substantially adjacent to one another.

18. The wireless communication device of claim 17, further comprising a hinge that mechanically couples the two members together and is operably coupled to the position detector, wherein the position detector is arranged to detect a rotation of one of the two members about the hinge such that the two members are no longer positioned substantially adjacent to one another.

19. The wireless communication device of claim 10, further comprising a second acoustic transducer that facilitates speakerphone operation of the wireless communication device when the wireless communication device is configured in at least one of the first configuration and the second configuration.

20. The wireless communication device of claim 10, wherein the user interface includes a microphone to facilitate voice activated operation of the wireless communication device.

21. A wireless communication device comprising:

acoustic transmission means for transmitting acoustic energy to a user of the wireless communication device;

acoustic reception means for receiving acoustic energy from the user;

means for configuring the wireless communication device into an open configuration and a closed configuration;

means for receiving an input from the user identifying a target communication device for participation in a communication while the wireless communication device is configured in the closed configuration;

means for detecting a change in a present physical configuration of the wireless communication device from the closed configuration to the open configuration; and means for automatically initiating the communication with the target communication device responsive to detection of a reconfiguration of the wireless communication device into the open configuration.

22. A wireless communication device comprising:

an acoustic transducer;

a microphone;

a first housing member that includes the acoustic transducer;

a second housing member that includes the microphone;

a hinge mechanically coupling the first housing member to the second housing member;

a switch operably coupled to the hinge, the switch generating a first signal when the first housing member is positioned in a first configuration substantially adjacent to the second housing member and generating a second signal when the first housing member is positioned in a second configuration in which the first housing member is not substantially adjacent to the second housing member;

a user interface arranged to receive an input from a user identifying a target communication device for participation in a communication while the first housing member and the second housing member are positioned in the first configuration;

a processor, operably coupled to at least the user interface and the switch; and a memory operably coupled to the processor, the memory including operating instructions that, when executed by the processor, control the processor to automatically initiate the communication with the target communication device responsive to generation of the second signal by the switch.

* * * * *